US006192645B1

(12) United States Patent
Benz et al.

(10) Patent No.: US 6,192,645 B1
(45) Date of Patent: Feb. 27, 2001

(54) ANGLE BRACKET FOR JOINING AT LEAST A FIRST SECTION BAR AND A SECOND SECTION BAR

(75) Inventors: Albrecht Benz, Leinfelden-Echterdingen; Joerg Walther, Korntal; Johannes Koban, Stuttgart; Olaf Klemd, Markgroeningen; Armin Breitenbücher, Pluederhausen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/195,948

(22) Filed: Nov. 19, 1998

(30) Foreign Application Priority Data

Nov. 19, 1997 (DE) .......................................... 297 20 486 U

(51) Int. Cl.$^7$ ...................................................... F16B 7/00
(52) U.S. Cl. ........................ 52/656.1; 52/656.9; 52/657; 403/231; 403/375; 403/403; 248/225.11
(58) Field of Search ............................... 52/238.1, 656.1, 52/656.9, 658, 657, 665; 403/403, 231, 375, 188, 189, 205, 177; 248/225.11

(56) References Cited

U.S. PATENT DOCUMENTS

| 292,003 | * | 1/1884 | Garretson | 403/231 |
|---|---|---|---|---|
| 2,146,333 | * | 2/1939 | Deming | 403/231 |
| 3,940,900 | * | 3/1976 | Russo | 52/656.1 |
| 4,030,846 | * | 6/1977 | Flototto | 403/231 |
| 4,074,947 | * | 2/1978 | Matake et al. | 403/231 |
| 4,168,922 | * | 9/1979 | Worrallo | 403/231 |
| 4,685,839 | | 8/1987 | Plater et al. | |
| 4,973,187 | * | 11/1990 | Sauder | 403/231 X |
| 5,425,520 | * | 6/1995 | Masumoto | 403/231 X |
| 5,481,842 | * | 1/1996 | Gautreau | 52/656.9 |
| 5,579,621 | * | 12/1996 | Fang | 403/231 X |
| 5,685,662 | * | 11/1997 | Rollin et al. | 403/231 |
| 5,846,018 | * | 12/1998 | Frobosilo et al. | 403/403 |

FOREIGN PATENT DOCUMENTS

| 37 38 128 | | 7/1988 | (DE) . | |
|---|---|---|---|---|
| 297 04 977 U | | 5/1997 | (DE) . | |
| 983 554 | | 6/1951 | (FR) . | |
| 1246010 | * | 10/1960 | (FR) | 52/656.9 |
| 2633343 | * | 12/1989 | (FR) | 403/403 |
| 2678031 | * | 12/1992 | (FR) | 403/403 |
| 1145852 | * | 3/1969 | (GB) | 403/231 |
| 3-199705 | * | 8/1991 | (JP) | 403/231 |
| WO88/08940 | | 11/1988 | (WO) . | |

OTHER PUBLICATIONS

"Bosch, Flexible Automation, Basic Mechanical Elements," vol. 1996/97, pp. 3–1 through 3–25. Mentioned in the specification.

* cited by examiner

Primary Examiner—Laura A. Callo
(74) Attorney, Agent, or Firm—Kenyon & Kenyon

(57) ABSTRACT

An angle bracket for joining two section bars has a relatively great stability, especially for use for partitions and safety walls. This stability is achieved by supporting walls that join the two legs of an angle bracket to one another and have an outwardly rounded outside contour. This design is relatively simple and inexpensive to implement and allows these angle brackets to be compatible with known designs.

8 Claims, 3 Drawing Sheets

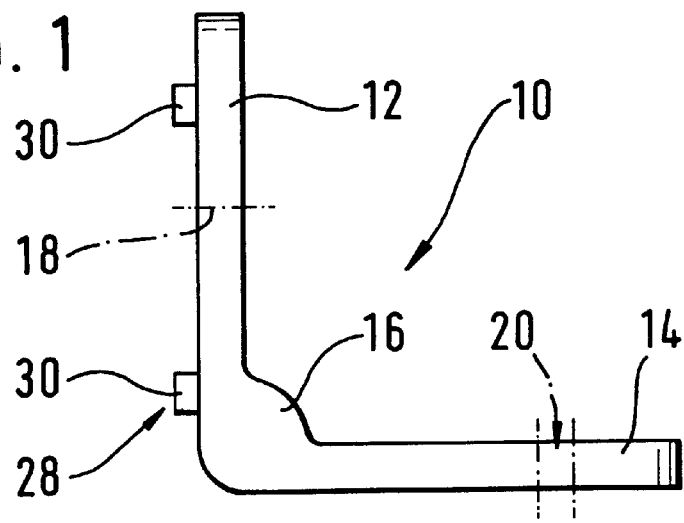
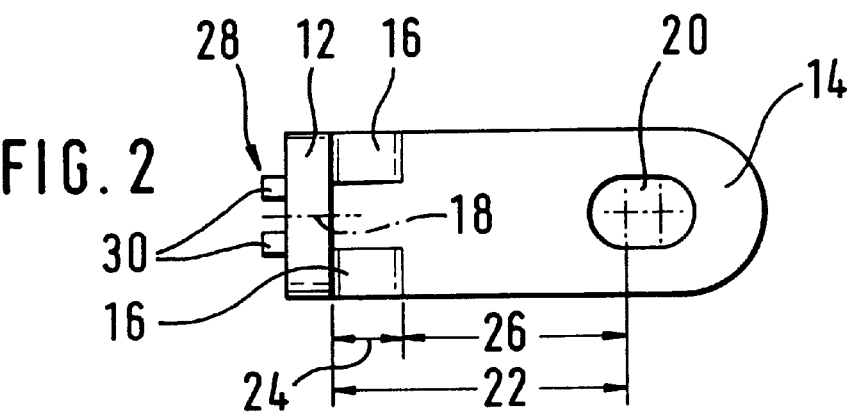
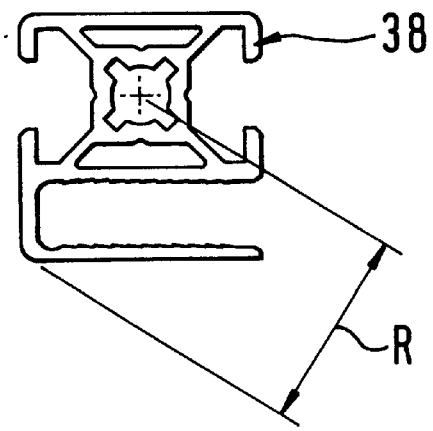

ANGLE BRACKET FOR JOINING AT LEAST A FIRST SECTION BAR AND A SECOND SECTION BAR

FIELD OF THE INVENTION

The present invention relates to an angle bracket.

BACKGROUND INFORMATION

Many variants of angle brackets are already known, e.g., from the publication "Bosch, Flexible Automation, Basic Mechanical Elements", volume 1996/97, pages 3-1 through 3-25.

To form partitions or safety walls, which are supposed to protect a hazardous area from unauthorized entry or access, the known angle brackets are mounted on supporting sections to attach framework constructions in the form of safety screens or safety panels, for example, on these supporting sections. In this regard, known angle brackets have the disadvantage of relatively low stability. Notching effects at the transition point of the two legs of an angle bracket allow only relatively lightweight framework constructions to be attached.

SUMMARY OF THE INVENTION

An angle bracket according to the present invention has the advantage of an especially high stability, so that relatively heavy framework constructions can also be secured safely and reliably to supporting sections. The supporting sections can therefore be positioned at greater distances from one another. This saves material costs and assembly costs for the partitions.

The angle bracket according to the present invention allows the framework constructions to be connectable to the supporting sections at variable distances and in almost any angular positions without making the construction and thus the manufacture of the mounting bracket or its assembly more difficult in comparison with known design variants. The angle bracket can also be designed to be compatible with known design variants, thus covering a wide range of applications.

According to the angle bracket of the present invention, centering devices are formed only on the first of the two legs of the angle bracket and engage with play in a longitudinal groove on the supporting sections. These centering devices achieve the result that the angle bracket can be arranged so that the angle bracket is centered and twisting is prevented, allowing displaceability in the direction of the longitudinal groove. In addition, the angle bracket according to the present invention includes section bars that can be arranged on both the inside and outside of the second leg. A further advantage of the angle bracket according to the present invention is that it can be manufactured especially inexpensively by a die-casting method.

BRIEF DESCRIPTION OF THE DRAWINGS

FIG. 1 shows a side view of a first embodiment of an angle bracket according to the present invention.

FIG. 2 shows a top view of the angle bracket according to FIG. 1.

FIG. 4 shows a cross-sectional view of an example of the section bar according to FIG. 1.

DETAILED DESCRIPTION

Figure 3:
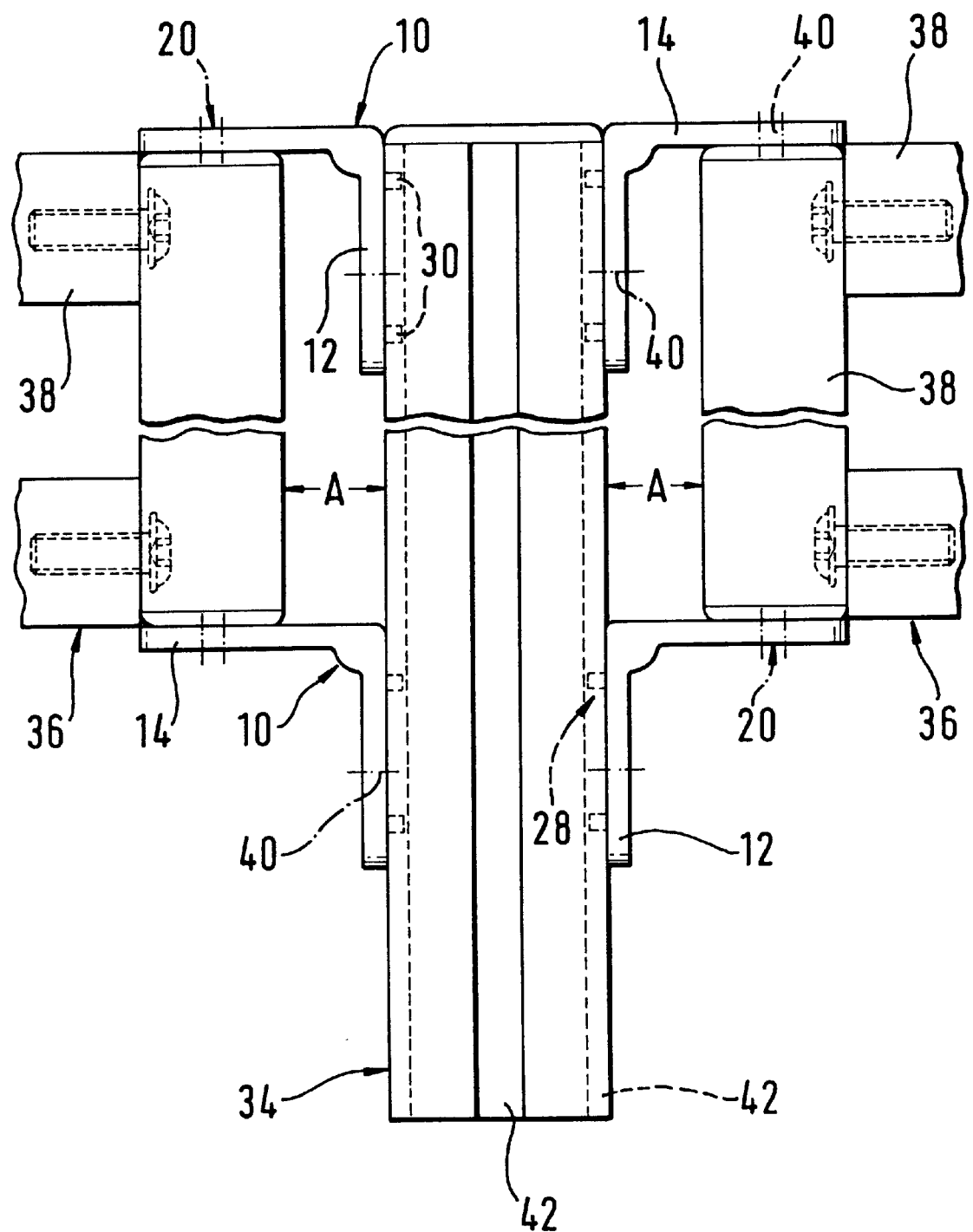
FIG. 3 shows a side view of one example of an application of such an angle bracket on a partition or safety wall.

Angle bracket 10 shown in FIGS. 1 and 2 has a first leg 12 and a second leg 14. These two legs 12, 14 are each rigidly joined at one end at a right angle. The outer ends of legs 12, 14, opposite the joined ends, are rounded in a semicircular shape. In this embodiment, the two legs 12, 14 are designed with equal lengths, for example.

The transition point from first leg 12 to second leg 14 is reinforced by two supporting walls 16, for example, which are spaced apart. These two supporting walls 16 end with their outsides facing away from one another flush with the end faces of angle bracket 10 and their outside contour is concave. This results in uncritical notching effects at the points of transition from supporting wall 16 to legs 12, 14 when angle bracket 10 is under load.

In addition, two legs 12, 14 are provided with recesses arranged symmetrically with respect to the longitudinal axes of legs 12, 14. In the case of first leg 12, the recess is a bore hole 18, while the recess of second leg 14 is designed as an elongated hole 20.

This elongated hole 20 runs in the direction of the extent of second leg 14 and has a distance 22 with respect to the inside wall of first leg 12. Distance 22 is composed of the length of two length segments 24, 26. First length segment 24 corresponds to the length of supporting wall 16 in the direction of the extent of second leg 14, while the second length segment 26 corresponds to the distance between the end of supporting wall 16 and the center of elongated hole 20 facing first leg 12. The dimensions of this length segment 26 are such that it is longer than the largest radius R of rotation (FIG. 4) of a section bar 38 to be mounted on second leg 14. This section bar 38 can therefore be turned about its longitudinal axis into any angular position with respect to first leg 12 and thus with respect to a section bar joined to said first leg 12 without striking supporting walls 16 of angle bracket 10. Section bar 38 is shown in a top view of an example of a design in FIG. 4 and in a side view in FIG. 3.

Angle bracket 10 is secured to the section bars by bolts 40 (FIG. 3), for example, passing through bore hole 18 and elongated hole 20. Elongated hole 20 of second leg 14 thus permits a precision adjustment of the two section bars joined by this angle bracket 10.

Furthermore, a centering device 28 is provided on the outside of first leg 12. This centering device 28 is formed by a total of four projections 30 extending outward. Projections 30 may be cuboid in shape, for example, and form the corners of a rectangle secured by them. Since two projections 30 are aligned pairwise, only two of four projections 30 are visible in FIGS. 1 and 2. The longitudinal side of the rectangle secured by projections 30 runs parallel to the direction of extent of first leg 12, and consequently the narrow side is perpendicular to it. The dimension of the long side is selected so that a reliable longitudinal guidance of angle bracket 10 in a groove of the section bar (not shown) is guaranteed by projections 30. The narrow side is dimensioned so that some play remains between centering device 28 and this groove, so that angle bracket 10 can be displaced longitudinally along the groove.

One embodiment of such angle brackets 10 is illustrated in FIG. 3, showing a section of a partition or safety wall having a supporting section 34 which can be anchored on the floor in a manner not shown here. Two framework constructions 36 are mounted on this supporting section 34 independently of one another, each using two angle brackets 10 anchored one above the other on one of the outsides of supporting section 34. Framework constructions 36 are in turn connected by fastening elements 40, e.g., screws or bolts, to angle brackets 10.

Framework constructions 36 may be screens or panels, for example, enclosed by a frame formed by section bars 38. These framework constructions 36 are anchored at second legs 14 of angle brackets 10 with their section bars 38 running parallel to the longitudinal axis of supporting section 34. Elongated hole 20 in second legs 14 makes it possible to adjust distance A between supporting section 34 and section bars 38 to the given conditions in the case of each assembly. Even minimally adjustable distance A permits section bars 38 to be turned into any angular position with respect to supporting section 34. Framework constructions 36 can thus be joined to supporting section 34 not only in 90° and 180° positions.

In addition, FIG. 3 shows that projections 30 of centering device 28 on angle brackets 10 engage in grooves provided on the outsides of supporting section 34. This yields a longitudinally displaceable centered arrangement of angle brackets 10 on supporting sections 34 while at the same time permitting angle brackets 10 to be prevented from rotating.

FIG. 4 shows a top view of a section bar 38 as an example. This view shows the largest radius R of rotation of this section bar 38 which determines the length of segment 26 of angle bracket 10.

Figure 5:
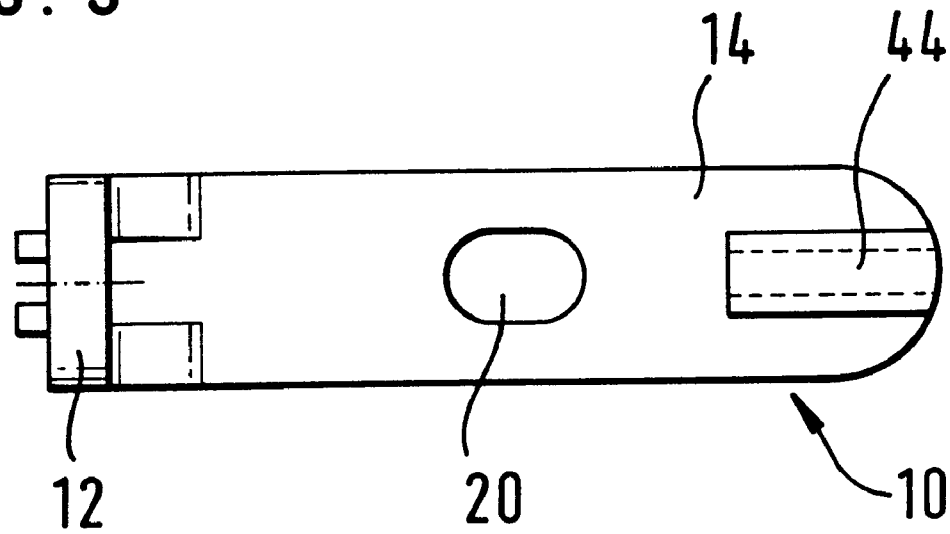
FIG. 5 shows a top view of another embodiment of the angle bracket according to the present invention.

FIG. 5 shows another embodiment of an angle bracket 10, where second leg 14 is extended beyond elongated hole 20 and has a form element 44 on its bearing face which faces section bar 38 to be mounted. This form element 44 is arranged in the area of the end of second leg 14 facing away from first leg 12 and is symmetrical to the axis thereof. Form element 44 is designed as a web with a T-shaped or dovetailed cross section and is some distance away from elongated hole 20. Therefore, form element 44 projects into groove 42 of a horizontal section bar 38 of a framework construction 36 connected to angle bracket 10 and establishes an engagement between this framework construction 36 and supporting section 34 without limiting the possibility of adjusting distance A between supporting section 34 and section bars 38 (FIG. 3) to the use conditions.

Figure 6:
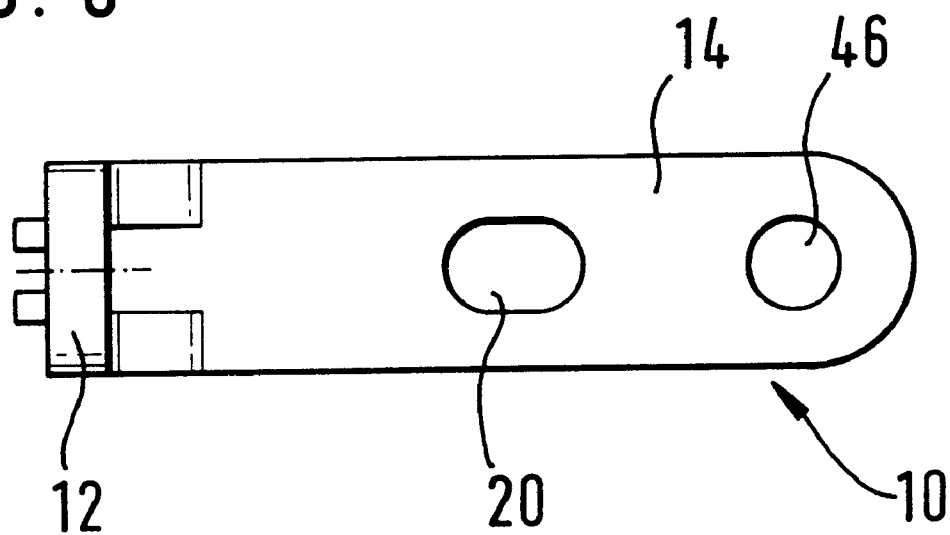
FIG. 6 shows a top view of another embodiment of the angle bracket according to the present invention.

FIG. 6 shows an angle bracket 10 whose second leg 14 is lengthened beyond elongated hole 20 for providing an additional bore hole 46. With this additional bore hole 46, additional engagement can be achieved, if necessary, between angle bracket 10 and a framework construction 36 (FIG. 3) which can be mounted using a stud or bolt in elongated holes 20 of lower angle bracket 10.

What is claimed is:

1. An angle bracket for joining at least a first section bar and a second section bar, each one of the first section bar and the second section bar having a central bore hole and at least one outside surface provided with a longitudinal groove, the angle bracket comprising:

a first leg having a recess corresponding to a bore hole for receiving a first fastening element coupled to one of the first section bar and the second section bar;

a second leg having a recess corresponding to an elongated hole for receiving a second fastening element coupled to another one of the first section bar and the second section bar, the second leg being situated in a perpendicular arrangement with respect to the first leg; and a centering device situated on an outside surface of at least one of the first leg and the second leg and for engaging the longitudinal groove of a respective one of the first section bar and the second section bar, wherein each one of the first leg and the second leg includes at least one supporting wall having an outwardly rounded surface joining at least a section of an inside surface of one of the first leg and the second leg to at least a section of an inside surface of another one of the first leg and the second leg, the at least one supporting wall being arranged so that one of the first section bar and the second section bar is turnable without contacting the at least one supporting wall, wherein the first leg is adapted to being coupled to a longitudinal side of the first section bar, and wherein each face of the second section bar is adapted to being arranged on the second leg so that a longitudinal axis of the first section bar is adapted to being parallel to a longitudinal axis of the second section bar.

2. The angle bracket according to claim 1, wherein:

the at least one supporting wall includes a first said supporting wall separated by a predetermined distance from a second said supporting wall, each one of the first said supporting wall and the second said supporting wall includes a side surface extending into a corresponding end face of the angle bracket, and the side surface of the first said supporting wall and the side surface of the second said supporting wall face away from each other.

3. The angle bracket according to claim 1, wherein the centering device is situated on the first leg and is adapted to being loosely engaged in the longitudinal groove of the one of the first section bar and the second section bar joined to the first leg.

4. The angle bracket according to claim 3, wherein the centering device includes four centering projections arranged in a rectangle.

5. The angle bracket according to claim 1, wherein the angle bracket is a one-piece die-cast part.

6. An angle bracket for joining at least a first section bar and a second section bar, each one of the first section bar and the second section bar having a central bore hole and at least one outside surface provided with a longitudinal groove, the angle bracket comprising:

a first leg having a recess corresponding to a bore hole for receiving a first fastening element coupled to one of the first section bar and the second section bar;

a second leg having a recess corresponding to an elongated hole for receiving a second fastening element coupled to another one of the first section bar and the second section bar, the second leg being situated in a perpendicular arrangement with respect to the first leg; and a centering device situated on an outside surface of at least one of the first leg and the second leg and for engaging the longitudinal groove of a respective one of the first section bar and the second section bar, wherein each one of the first leg and the second leg includes at least one supporting wall having an outwardly rounded surface joining at least a section of an inside surface of one of the first leg and the second leg to at least a section of an inside surface of another one of the first leg and the second leg and wherein a distance between the elongated hole of the second leg and the first leg is adapted to being greater than a sum of a length of the at least one supporting wall extending in a direction of the second leg and a length of a greatest radius of rotation of the one of the first section bar and the second section bar coupled to the second leg so that one of the first section bar and the second section bar is turnable without contacting the at least one supporting wall.

7. An angle bracket for joining at least a first section bar and a second section bar, each one of the first section bar and the second section bar having a central bore hole and at least one outside surface provided with a longitudinal groove, the angle bracket comprising:
- a first leg having a recess corresponding to a bore hole for receiving a first fastening element coupled to one of the first section bar and the second section bar;
- a second leg having a recess corresponding to an elongated hole for receiving a second fastening element coupled to another one of the first section bar and the second section bar, the second leg being situated in a perpendicular arrangement with respect to the first leg; and
- a centering device situated on an outside surface of at least one of the first leg and the second leg and for engaging the longitudinal groove of a respective one of the first section bar and the second section bar, wherein each one of the first leg and the second leg includes at least one supporting wall having an outwardly rounded surface joining at least a section of an inside surface of one of the first leg and the second leg to at least a section of an inside surface of another one of the first leg and the second leg, the at least one supporting wall being arranged so that one of the first section bar and the second section bar is turnable without contacting the at least one supporting wall; wherein the second section bar is adapted to being arranged on one of a side of the second leg facing the first leg and a side of the second leg facing away from the first leg, and wherein the first section bar and the second section bar are adapted to forming an angle of rotation having a predetermined range.

8. A partition, comprising:
at least one supporting section; and
at least one framework construction situated on the at least one supporting section via at least one angle bracket joining at least a first section bar and a second section bar, each one of the first section bar and the second section bar having a central bore hole and at least one outside surface provided with a longitudinal groove, wherein the at least one angle bracket includes:
- a first leg having a recess corresponding to a bore hole receiving a first fastening element coupled to one of the first section bar and the second section bar,
- a second leg having a recess corresponding to an elongated hole receiving a second fastening element coupled to another one of the first section bar and the second section bar, the second leg being situated in a perpendicular arrangement with respect to the first leg, and
- a centering device situated on an outside surface of at least one of the first leg and the second leg and engaging the longitudinal groove of a respective one of the first section bar and the second section bar, wherein each one of the first leg and the second leg includes at least one supporting wall having an outwardly rounded surface joining at least a section of an inside surface of one of the first leg and the second leg to at least a section of an inside surface of another one of the first leg and the second leg, the at least one supporting wall being arranged so that one of the first section bar and the second section bar is turnable without contacting the at least one supporting wall.

* * * * *